INVENTOR.
JAMES A. McDONALD
BY
William H. Meagher
Attorney

INVENTOR.
JAMES A. McDONALD
BY
William H. Meagher
Attorney 3,428,854

TEMPERATURE COMPENSATION OF DEFLECTION CIRCUITS

James A. McDonald, Indianapolis, Ind., assignor to Radio Corporation of America, a corporation of Delaware Filed May 14, 1965, Ser. No. 455,685
U.S. Cl. 315—27 4 Claims
Int. Cl. H01j *29/70*

ABSTRACT OF THE DISCLOSURE

Deflection circuit involves sawtooth voltage waveform generation across a capacitor in a negative feedback path looped around a high current gain transistor amplifier. Changes in the characteristics of the feedback amplifier transistors can have an adverse effect on deflection linearity, particularly at picture top; compensation is provided through automatic adjustment of the voltage on the feedback capacitor at the beginning of the trace interval, as by use of a thermistor in the capacitor discharging current path. Driving circuit for output transistor is disposed in a manner ensuring ability to overcome the most adverse leakage current condition so that output transistor cutoff during retrace (capacitor discharging) interval is guaranteed. Danger of thermal runaway is thereby precluded.

Figure 1:
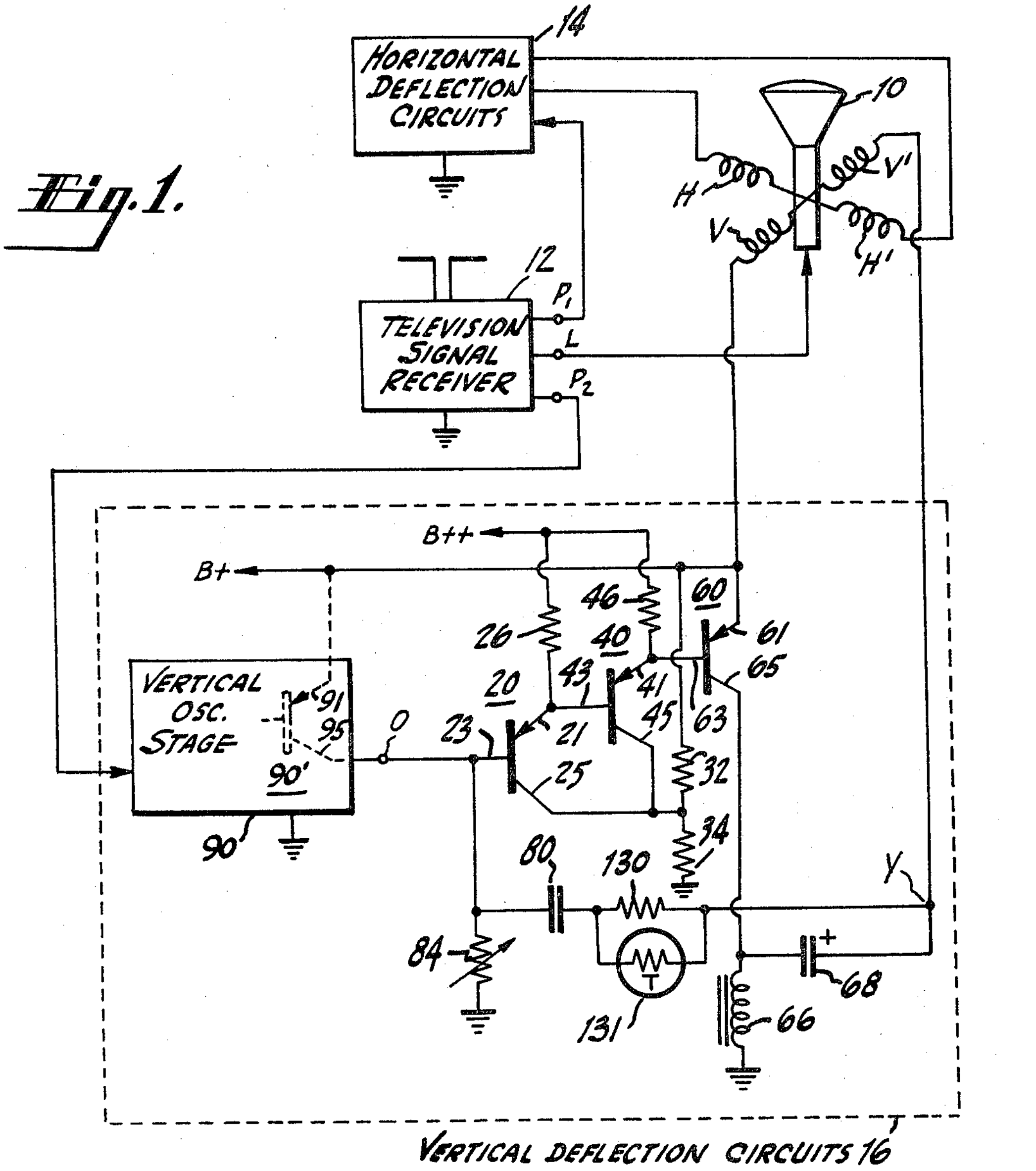

This invention relates generally to temperature compensation of deflection circuits, and particularly to circuit arrangements for reducing adverse effects of temperature variations on the operation of a transistorized deflection circuit.

In a copending patent application, Ser. No. 455,736, of John B. Beck and Roland N. Rhodes, entitled "Transistor Deflection Circuits" and filed concurrently herewith, application of the principles of the so-called "Miller Integrator" to transistor deflection circuits is discussed in detail, and resultant deflection circuits of an advantageous character for serving the vertical deflection function in a television receiver are disclosed. In such circuits, the receiver's vertical yoke windings are traversed by a desired current waveform in response to sawtooth voltage waveform generation across a capacitor in a negative feedback path looped around a high current gain transistor amplifier. The capacitor is subject to alternate charging and discharging in an operating cycle recurring at the (60 c.p.s.) television field rate.

In television receiver use of the above-discussed circuits, varying temperature conditions present certain practical problems, particularly in view of the noted temperature sensitivity of transistors. Changes in the characteristics of the feedback amplifier transistors with temperature can have an adverse effect on deflection linearity, particularly at the top of the picture (i.e., corresponding to the beginning of the vertical trace interval, when the transition into full Miller-type operation is taking place). In accordance with a feature of the present invention, compensation for such adverse effects on linearity is provided through automatic adjustment of the voltage on the feedback capacitor at the beginning of the trace interval. Pursuant to a particular embodiment of the present invention, such automatic adjustment is effected through inclusion of a thermistor in the capacitor discharging circuit to achieve a properly proportioned variation of the capacitor discharge time constant with temperature.

Under high temperature conditions, leakage current in the output transistor of the feedback amplifier can cause a departure from desired operating conditions. For proper circuit operation, it is important that the output transistor be cut off during the retrace interval when the capacitor discharge is to be effected. A further feature of the present invention relates to an arrangement for driving the output transistor in a manner ensuring proper cutoff thereof during retrace, under the most adverse high temperature (and resultant high leakage current) conditions to be encountered. In accordance with a particular embodiment of the present invention, wherein the driving stage is an emitter follower, the desired result is ensured through return of the driver stage emitter to a source of significantly higher magnitude unidirectional potential than that to which the output transistor emitter is returned. Where the feedback amplifier includes an additional pre-driver stage in the form of an emitter follower, a similar emitter return arrangement is also provided for that stage to the same end.

A primary object of the present invention is to provide novel and improved transistor deflection circuits.

A further particular object of the present invention is to provide apparatus for minimizing adverse effects of temperature changes on the operation of a transistorized vertical deflection circuit for a television receiver.

Figure 2:
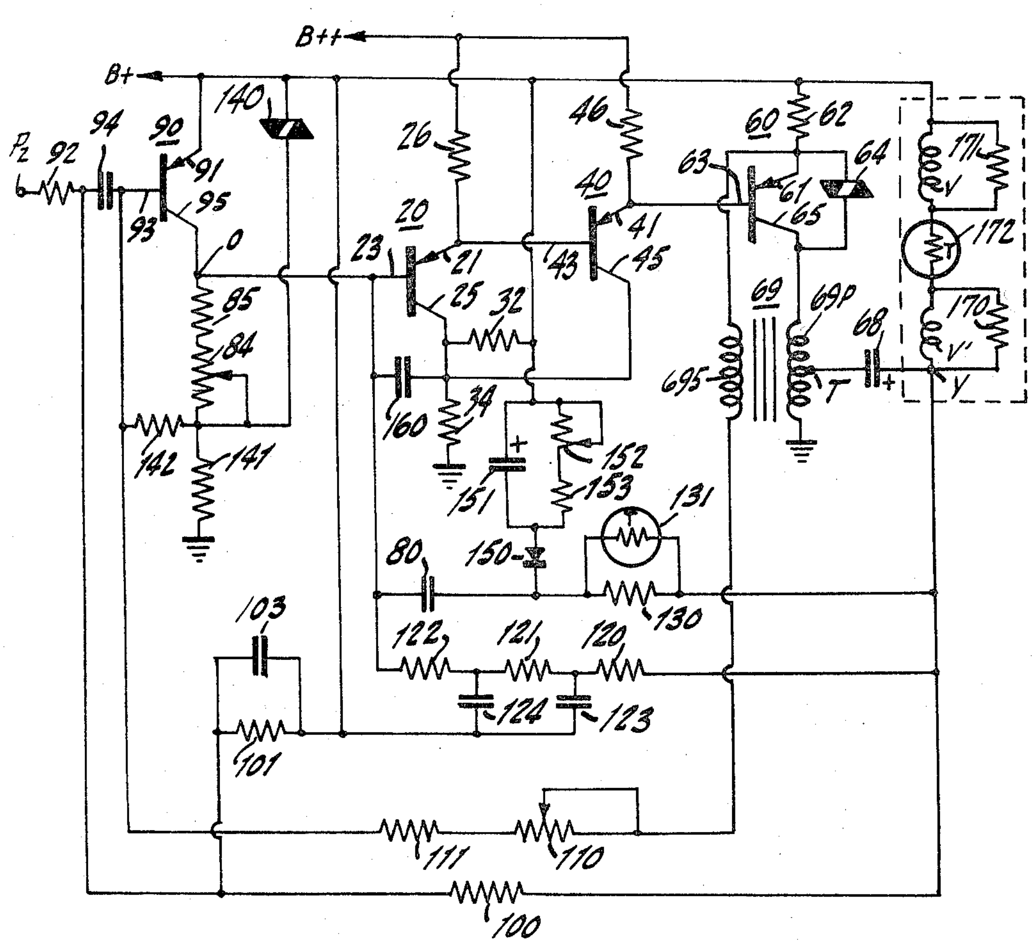

Other objects and advantages of the present invention will be recognized by those skilled in the art after a reading of the following detailed description and an inspection of the accompanying drawings in which:

FIGURE 1 illustrates, in block and schematic form, a television receiver incorporating a vertical deflection circuit embodying the principles of the present invention; and FIGURE 2 illustrates schematically a modification of the embodiment of FIGURE 1.

In FIGURE 1, the bulk of the circuits of a television receiver, serving to provide signals for energizing a picture tube 10, are represented by a single block 12, labelled "television signal receiver." The receiver unit 12 may incorporate the usual elements requisite to provide video signals (at output terminal L) for appropriate intensity modulation of the picture tube's electron beam, as well as to provide suitable synchronizing pulse information (at output terminlas $P_1$ and $P_2$) to synchronize, in respective horizontal and vertical deflection circuits 14 and 16, the energization of the respective windings (H, H' and V, V') of the picture tube's deflection yoke.

In the vertical deflection arrangement of FIGURE 1, a sawtooth current waveform is caused to pass through the vertical deflection windings V and V' of the deflection yoke, the windings V and V' being connected in series between a source of unidirectional potential (B+) and yoke input terminal Y. The flow of the desired sawtooth current waveform in the windings, which appear essentially resistive, is in response to the development of a sawtooth voltage waveform at terminal Y.

The development of this sawtooth voltage waveform is effected through use of a transistorized arrangement employing the principles of the "Miller Integrator."

Transistors 20, 40 and 60 are cascaded to form a high current gain amplifier. Negative feedback is established between the amplifier output and the amplifier input via a path incorporating a capacitor 80. Capacitor 80 is subject to alternate charging and discharging, per switching action of the synchronized vertical oscillator stage 90. The amplifier output voltage waveform (at terminal Y) is a substantially linear sawtooth voltage waveform, per "Miller Integrator" principles.

To consider the circuit arrangement and operation in greater detail, it may first be noted that the vertical oscillator stage 90, while not illustrated in schematic detail, but rather shown by block representation, is provided with a representation of an aspect of its function through the dotted line showing of a switching transistor 90'. The switching transistor 90', when conducting, connects the oscillator stage output terminal O to the receiver's source of B+ potential; when the switching transistor is non-conductive, the output terminal O sees the oscillator stage 90 as an open circuit.

For the purposes of describing the operation of the remainder of the vertical deflection circuit, this representation is adequate in representing the essence of the functioning of stage 90 with respect to the output terminal O. It should be recognized that, in operation, the opening and closing of the switch constituted by transistor 90' occurs on a recurrent basis, properly timed for video signal display purposes through synchronization of the stage operation by the synchronizing pulse information supplied from terminal $P_2$. While the oscillator stage 90 may actually comprise a self-contained oscillator arrangement, such as the familiar blocking oscillator, a more preferable arrangement involves establishment of astable multivibrator action between stages 90 and the output yoke-driving stage 60. Details of such an arrangement are not necessary for present purposes, but will be discussed in connection with a subsequent embodiment.

The oscillator stage output terminal O is directly connected to the base electrode 23 of transistor 20. Transistor 20 is arranged in an emitter follower configuration, its emitter electrode 21 being connected via an emitter resistor 26 to a source (B++) of unidirectional potential of appreciably higher magnitude than that provided by the B+ supply. Transistor 40 provides a second emitter follower stage, appearing as an emitter load of the transistor 20 emitter follower, the base electrode 43 of transistor 40 being directly connected to emitter electrode 21, and the emitter electrode 41 of transistor 40 being connected via an emitter resistor 46 to the B++ terminal. The collector electrodes 25 and 45 of the two emitter follower stages are jointly connected to an appropriate division point on a low impedance voltage divider connected between B+ and chassis ground; the voltage divider comprises the series combination of resistors 32 and 34, with the collector electrodes connected to the junction of the series resistors.

The output of the cascaded emitter follower stages is applied to the base electrode 63 of output transistor 60, base 63 being directly connected to emitter 41. The emitter 61 of transistor 60 is connected to the B+ terminal. A direct current conductive path between the collector electrode 65 of transistor 60 and chassis ground is provided through a choke 66 (of high AC impedance). An alternating current signal path is also provided between the collector 65 and the emitter 61, this path comprising a DC blocking capacitor 68 in series with the vertical yoke windings V, V'. The aforementioned yoke input terminal Y appears at the junction of blocking capacitor 68 and the yoke winding V'.

Feedback between terminal Y and the base input of transistor 20 is provided via a path comprising capacitor 80 in series with the parallel combination of a fixed resistor 130 and a thermistor 131. A variable resistor 84 is connected between the base electrode 23 of transistor 20 and chassis ground.

The nature of the feedback provided via capacitor 80 is negative, since the emitter follower stages 20 and 40 produce no signal phase reversal, whereby only a single phase reversal (i.e., that contributed by stage 60) is provided within the feedback loop.

To appreciate the desired mode of operation of the illustrated apparatus it may be convenient to first consider the operation assuming the omission of emitter follower stages 20 and 40, i.e., whereby terminal O would be directly connected to the base electrode 63 of output transistor 60. With switching transistor 90' non-conductive and transistor 60 biased for conduction, a charging circuit for capacitor 80 is established between B+ and chassis ground, the circuit comprising the series combination of resistor 84, the parallel-R network 130–131, capacitor 80, blocking condenser 68 and the conducting output transistor 60. Assuming resistor 84 to be large in resistance value relative to the effective resistance value of the parallel-R network 130–131, resistor 84 will be primarily determinative of the charging rate. The negative feedback action tends to oppose changes in the potential at terminal O during the charging period, whereby the voltage across resistor 84 varies but slightly; the current therethrough is accordingly relatively constant. A capacitor charging current of such a relatively constant character assures a high degree of linearity of the resultant sawtooth voltage. The charging time constant is effectively larger than that suggested by the physical values of capacitor 80 and resistor 84 due to the dynamic action of the amplifier which multiplies the effective capacitance by a factor dependent upon the amplifier gain.

When the switching transistor 90' is conducting and transistor 60 is driven to cut off, a discharging circuit for capacitor 80 is completed comprising, in series, the conducting transistor 90', capacitor 80, the parallel-R network 130–131 and the yoke windings V, V'. Network 130–131 is primarily determinative of the discharging rate; with the effective resistance value of the network appropriately smaller than resistor 84, per the previous assumption, the discharging time constant is much shorter than the charging time constant.

From the foregoing simplified description, it can be seen that the effect of periodic conduction and non-conduction of switching transistor 90' is to develop across capacitor 80 (i.e., at terminal Y with respect to chassis ground) a substantially linear sawtooth voltage waveform, resulting in the desired sawtooth current waveform flowing through the effectively resistive yoke windings V, V'.

However, it should be appreciated that for the above described type of operation to take place, it is essential that the transistor amplifier present a very high input impedance to terminal O. As a practical matter, while special transistors such as those of the so-called MOS type may inherently present high input impedances, the conventional transistor is a relatively low input impedance device. Thus, if transistor 60 were a conventional transistor and were relied upon as the sole amplifying device within the feedback loop, its relatively low input impedance would deteriorate the capacitor charging action desired. However, by interposing the transistor emitter follower stages between terminal O and the base input of transistor 60, this problem is solved. That is, terminal O now sees a very high input impedance; i.e., the input impedance of an emitter follower, incorporating in its emitter load a further emitter follower, which in turn incorporates in its emitter load the input impedance of transistor 60. The net input impedance presented by this combination is sufficiently large to permit the desired charging action.

The emitter follower stages 20 and 40 also serve to contribute current gain within the negative feedback loop, whereby a high current gain amplifier is realized. The capacitance multiplying effect of the arrangement is thereby enhanced. By reliance on this capacitance multiplying effect, the effect of a large valued capacitor is obtained, though the actual capacitor chosen for use as capacitor 80 may be a relatively small, stable and inexpensive capacitor of the paper type (of a .1 microfarad value, for example).

In the foregoing general description of the desired operation of the vertical deflection circuits 16, the possible adverse effects of temperature changes have not been discussed. It is the elimination or minimization of such effects to which the present invention is directed. A problem generally associated with the use of transistors is the significant change in their operating characteristics as temperature changes. In the particular deflection circuit arrangement under consideration, such characteristic modification can manifest itself in linearity distortions as temperature varies; pursuant to a feature of the present invention, network 130–131 functions to substantially alleviate this problem.

For a simplified explanation of this linearity problem, it may first be observed that a temperature increase affects the transistor in the feedback amplifier in such manner that a lesser amount of forward bias between base and emitter electrodes is required to obtain a given collector current. The main result of interest is a change in the effective turn-on time of output transistor 60 (specifically, a tendency to effect an earlier turn-on with respect to the end of retrace.)

To appreciate how such a change affects linearity, it must first be noted that during the initial portion of the trace interval (approximately, the first quarter) there is actually a period of transition into full Miller operation. At the cessation of retrace, opening of transistor 90′ to terminate discharge of the sawtooth capacitor does not instantaneously effect turn-on of output transistor 60. The capacitor charging commences, however, drawing on current stored in various reactive components of the overall circuit. As output transistor 60 comes into conduction, its increasing contribution must blend with the decreasing reaction contributions. The magnitude of the charge on the sawtooth capacitor at the initiation of the trace interval (i.e., the charge remaining thereon at the close of the discharging period) will necessarily influence the character of the contributions being blended during this transition period; thereafter, its effect will not be felt, with the Miller operation fully determining the linearity during the remainder of the trace interval.

When temperature increase tends to produce an earlier effective turn-on of the output transistor 60, proper blending of the above-noted contributions is disturbed. However, if the capacitor discharging time constant can be appropriately altered to provide a compensating change in the charge remaining at the close of retrace, a readjustment of the blending may be effected to retain proper linearity of the composite of the blended contributions. Network 130–131 performs this function. As previously noted, the effective resistance value of this network is primarily determinative of the capacitor discharging time constant. Thermistor 131 renders this resistance value temperature responsive, and by proper choice of the temperature-resistance characteristic of this device and choice of the resistance value of the parallel fixed resistor 130 in appropriate proportion to the values exhibited by the thermistor, the desired linearity compensation. It should be noted that such choices should take into account overall temperature effects in the operating circuit; i.e., while the noted transistor characteristic changes are a major element of the problem, temperature effects on other components will also be a contributing factor.

A second thermal effect confronted and solved in the circuit arrangement of FIGURE 1 relates to leakage current in a transistor, and the relative increase thereof with temperature increase. This effect is of particular concern with regard to the thermal stability of output transistor 60. In the desired mode of circuit operation, when transistor 90′ is switched on, it conducts, in saturation, the capacitor discharging current; during this retrace interval, transistor 60 should be off, driven into full cut-off by the saturation of transistor 90′. If, however, under high temperature conditions, when the base leakage current in transistor is large, the base drive from stage 40 is unable to supply sufficient current to exceed the leakage current, the desired cut-off condition will not be obtained, and the leakage current path may sustain the flow of discharging current; the consequence can be thermal runaway and transistor destruction.

To preclude the possibility of such thermal instability, the present invention provides for return of the emitter resistor 46 of the emitter follower driver stage 40 to the B++ source rather than to the B+ source otherwise employed in the circuit. B++ is chosen to be sufficiently large relative to B+ (e.g. 140 volts versus 30 volts) as to ensure that the response at emitter 41 to the saturation of transistor 90′ will supply sufficient current to base 63 to exceed the base leakage current under the highest temperature condition to be encountered. Thermal stability of transistor 60 is therefore ensured.

As illustrated in FIGURE 1, a similar emitter return arrangement for stage 20 may also be employed, to preclude the possibility of thermal instability in the driver transistor 40.

In FIGURE 2, a modification of the vertical deflection arrangement of FIGURE 1 is illustrated including details with regard to the vertical oscillator stage. Where possible, the same reference numerals employed in FIGURE 1 are re-employed in FIGURE 2 to designate elements of corresponding character and function. The embodiment of FIGURE 2 incorporates a number of features of other copending applications, filed concurrently herewith, as will be indicated in detail subsequently.

It may be observed that the general configuration of the FIGURE 1 embodiment is continued in FIGURE 2, with the emitter follower stage 20 having its base connected to terminal O, its emitter output driving emitter follower stage 40, which in turn drives output transistor stage 60. The yoke windings V, V′ are, as in FIGURE 1, connected in series with a DC blocking capacitor 68 between a B+ point and a point in the collector circuit of the output transistor 60. Yoke input terminal Y, at the junction of capacitor 68 and yoke winding V′ is coupled back to the base electrode 23 of transistor 20 via a negative feedback path including sawtooth capacitor 80. A resistive path between terminal O and chassis ground includes, inter alia, the variable resistor 84.

A starting point for discussion of the departures from and additions to the FIGURE 1 circuit arrangement can appropriately be the vertical oscillator stage for which terminal O is an output terminal. In FIGURE 2, the oscillator stage employs the transistor 90′, with its emitter directly connected to the source of B+, its collector electrode 95 directly connected to terminal O and its base electrode 93 coupled via the series combination of capacitor 94 and resistor 92 to the synchronizing pulse terminal $P_2$. Oscillatory action is obtained as transistor 90′ cooperates with the output transistor stage 60 in the fashion of an astable multivibrator, through the agency of feedback of negative-going flyback pulses generated at terminal Y to the base input of transistor 90′. The path for such flyback pulse application is via a resistor 100 in series with the capacitor 94, the resistor 100 being connected directly between yoke input terminal Y and the junction of resistor 92 and capacitor 94. A parallel RC network comprising resistor 101, shunted by capacitor 103, is coupled between the aforesaid junction and the B+ source, and serves a pulse shaping function, partially integrating the flyback pulse, and discriminating against the undesired feedback of horizontal frequency pulses, which may undesirably be induced in the vertical yoke windings via coupling from the horizontal yoke windings. For an understanding of the multivibrator-like oscillatory action, one should appreciate that the coupling from the transistor 60 collector to the transistor 90′ base via resistor 100 is complemented by the coupling from the transistor 90′ collector to the transistor 60 base via the cascaded emitter follower stages 20 and 40.

Synchronization of the multivibrator type action for ensuring a properly phased display is effected by means of the vertical sync pulse application from terminal $P_2$ to the base of transistor 95. To enhance the accuracy of the synchronization of the timing of vertical deflection wave generation, an additional waveform is fed back to the transistor 90' base. The source of this waveform is the secondary winding 69S of a transformer 69, the primary winding (69P) of which is connected in the collector circuit of transistor 60, in place of the choke 66 of FIGURE 1. Capacitor 68, linking the collector 65 to the yoke input terminal Y, is connected to a tapping point T on primary winding 69P, instead of being connected directly to the collector 65, as was done in FIGURE 1. The tapping down procedure is for impedance matching purposes, which may be required for practical values of yoke and transistor parameters. Where the yoke and transistor parameters are such as not to require impedance matching assistance, the tap may be eliminated an connections made to winding 69P in the same manner as the choke 66 of FIGURE 1.

Integration of the waveform induced in secondary winding 69S provides a voltage of a generally parabolic form, presenting a sharply curving cusp in the vicinity of turn-on time for transistor 90', at base 93, a resistive path including a variable resistor 110 in series with a fixed resistor 111 cooperates with the capacitance presented at base 93 to provide the integrating action. Adjustment of the resistance value of resistor 110 provides control over the cusp curvature, and therefore provides a convenient vertical hold control, since it is instrumental in determining the timing of the change of state of the multivibrator transistors. For a more detailed discussion of this hold control circuitry, reference may be made to the copending application, Ser. No. 455,730 of James A. McDonald, entitled "Transistor Deflection Control Arrangements" and filed concurrently herewith.

Also discussed in the above-named copending McDonald application is a further feedback arrangement which is shown in FIGURE 2 as linking yoke input terminal Y to the base electrode 23 of the emitter follower stage 20, such additional feedback path including a trio of resistors 120, 121 and 122 connected in series, in the order named between terminal Y and base 23. A capacitor 123 is connected between the junction of series resistors 120 and 121 and the B+ potential source; an additional capacitor 124 is connected between the junction of series resistors 121 and 122 and the B+ potential source. The effect of this network is to provide a doubly integrated version of the vertical flyback pulse to the input of the feedback amplifier 20–40–60. The furnishing of such a waveform is to effect so-called S-shaping of the current through the vertical yoke windings V, V'. Such shaping is appropriate, where relatively flat screen picture tubes are employed, since a perfectly linear sawtooth current will not provide a linear raster where the screen curvature does not bear a spherical surface relationship to the beam's deflection center. A more detailed discussion of these points will be found in the aforesaid McDonald application.

In the FIGURE 2 circuitry the height controlling variable resistor 84 is associated in series with a fixed series resistor 85, the latter serving a range limiting function. Moreover the series combination of resistors 84 and 85 returns terminal O, not to chassis ground, but rather to an intermediate point on a voltage divider formed by the series combination of a voltage dependent resistor (VDR) 140 and a fixed resistor 141, the intermediate return point being at the junction of resistors 140 and 141. The purpose of this arrangement is the stabilization of vertical deflection amplitude in the face of such parameter variations as line voltage changes. The base 93 of transistor 90' is also returned to this intermediate divider point by means of a resistor 142 for bias stabilization purposes. These features are discussed at greater length in the copending application, Ser. No. 455,748, of Todd J. Christopher and James A McDonald, entitled "Size Stabilization" and filed concurrently herewith, now U.S. Patent No. 3,388,285, issued June 11, 1968.

A further feature of the FIGURE 2 circuitry involves the function of diode 150. Diode 150 has its cathode electrode directly connected to the junction of sawtooth capacitor 80 and discharge resistor 130; the anode electrode of diode 150 is coupled by means of an RC network to the B+ potential source. The RC network includes a large valued capacitor 151 shunted by the series combination of a variable resistor 152 and a fixed resistor 153. The diode 150 network serves a "jitter" clamp function, forestalling any tendency of the feedback amplifier 20–40–60 to oscillate at a subharmonic of the vertical deflection frequency. The nature of the clamp circuit operation renders variable resistor 152 suitable for serving as a linearity control for the deflection circuit. For further details on this clamp circuit and linearity control arrangement reference may be made to another copending application, Ser. No. 455,682, of James A. McDonald and Todd J. Christopher, entitled "Deflection Control" and also filed concurrently herewith. Also discussed in the said McDonald et al. application is the use of a capacitor 160 coupled between the collector 25 and the base 23 of transistor 20 for suppression of spurious high frequency oscillations. Still another feature of said McDonald et al. application involves the utilization of a very low valued resistor 62 in the emitter return of transistor 60. In normal operation, the resistance value of resistor 62 is so very low (e.g., less than one ohm) as to have substantially no noticeable effect. However, should receiver turn-on conditions tend to result in the settling of transistor 60 into a highly conducting state approaching saturation, sufficient voltage will be developed across this resistor, and fed back to the base of transistor 90' (via feedback winding 69S in series with resistors 110 and 111) to initiate the desired multivibrator action.

It will be noted that the details of the yoke shown in FIGURE 2 reveals additional elements 170, 171 and 172 beyond those shown in the FIGURE 1 embodiment. Resistors 170 and 171, individually shunting the respective vertical yoke winding halves V and V' serve well known damping functions. Thermistor 172, interposed between the winding halves in the yoke current path serves to stabilize the yoke current amplitude in the face of temperature variations which may affect the effective resistance of the yoke windings, as disclosed in U.S. Patent No. 2,900,564 issued to William H. Barkow on Aug. 18, 1959.

A protection function is served by VDR 64, connected directly in shunt with the collector-emitter path of output transistor 60. The VDR 64 tends to limit the retrace pulse peak developed between collector 61 and emitter 65 when transistor 60 is rendered non-conducting; in its low resistance state under the peak voltage conditions, the VDR 64 bypasses the peak current to a substantial degree, precluding heavy reverse current through the transistor at a time of high potential so as to avoid possible transistor damage.

The temperature compensation features of the present invention are achieved in the FIGURE 2 embodiment in the same general manner as described in connection with FIGURE 1. Thus, network 130–131 again is determinative of the discharging time constant for sawtooth capacitor 80, and the thermal characteristics of thermistor 131 provide an automatic adjustment of this time constant with temperature changes; this alters the capacitor charge at the end of retrace in a direction and to a degree appropriate for compensation of the change in effective turn-on time for transistor 60 due to transistor characteristic changes. Also, the return of emitter resistors 26 and 46 to the B++ terminal precludes thermal instability in stages 40 and 60, as described in connection with FIGURE 1.

By way of example, there is presented in the table below a set of values for the various circuit elements of FIGURE 2, which set of values has proved satisfactory in operation:

| | | |
|---|---|---|
| Capacitor 68 | microfarads | 250 |
| Capacitor 80 | do | .10 |
| Capacitor 94 | do | .22 |
| Capacitor 103 | do | .1 |
| Capacitor 123 | do | .18 |
| Capacitor 124 | do | .18 |
| Capacitor 151 (electrolytic) | do | 1 |
| Capacitor 160 | do | .01 |
| Resistor 26 | ohms | 220,000 |
| Resistor 32 | do | 330 |
| Resistor 34 | do | 820 |
| Resistor 46 | do | 8,200 |
| Resistor 62 | do | .47 |
| Resistor 84 | do | 65,000 |
| Resistor 85 | do | 56,000 |
| Resistor 92 | do | 8,200 |
| Resistor 100 | do | 8,200 |
| Resistor 101 | do | 3,300 |
| Resistor 110 | do | 25,000 |
| Resistor 111 | do | 6,800 |
| Resistor 120 | do | 22,000 |
| Resistor 121 | do | 33,000 |
| Resistor 122 | do | 47,000 |
| Resistor 130 | do | 3,900 |
| Resistor 141 | do | 7,500 |
| Resistor 142 | do | 470,000 |
| Resistor 152 | do | 100,000 |
| Resistor 153 | do | 27,000 |
| Resistor 170 | do | 820 |
| Resistor 171 | do | 390 |
| Thermistor 131 | | 200,000 ohms at 25° C. |
| Thermistor 172 | | 10 ohms at 25° C. |
| VDR 64 | | 30 ma. at 72 volts |
| VDR 140 | | 2 ma. at 15 volts |
| Diode 150 | | Type FD333 |
| Transistor 20 | | Type 2501 |
| Transistor 40 | | Type 2482 |
| Transistor 60 | | Type 2500 |
| Transistor 90 | | Type 2502 |
| B+ supply | volts | 30 |
| B++ supply | do | 140 |

What is claimed is:

1. In a television receiver, a vertical deflection circuit comprising the combination of:
   - a transistor amplifier having an input terminal and an output terminal and providing appreciable current gain therebetween;
   - a vertical deflection winding coupled to said output terminal;
   - means for establishing a negative feedback path between said output terminal and said input terminal of said amplifier, said feedback path including a capacitor;
   - impedance means for connecting said amplifier input terminal to a point of reference potential;
   - a transistor device subject to periodic switching between conductive and non-conductive states;
   - means including a connection between said device and said input terminal for alternately permitting charging of said capacitor through said impedance means when said transistor device is in a non-conductive state and discharging said capacitor through said transistor device when said transistor is in a conductive state;
   - and means for automatically adjusting the time constant associated with said discharging of said capacitor in response to changes in ambient temperature;
   - said discharging time constant adjusting means including a thermistor interposed in a series with said capacitor in said feedback path, the impedance value of said impedance means being sufficiently large relative to the range of impedance values of said thermistor that resistance variations of said thermistor in response to changes in ambient temperature have comparatively little effect on the time constant associated with the charging of said capacitor.

2. In a television receiver, a vertical deflection circuit comprising the combination of:
   - a transistor amplifier having an input terminal and an output terminal and providing appreciable current gain therebetween;
   - a vertical deflection winding coupled to said output terminal;
   - means for establishing a negative feedback path between said output terminal and said input terminal of said amplifier, said feedback path including a capacitor;
   - impedance means for connecting said amplifier input terminal to a point of reference potential;
   - a transistor device subject to periodic switching between conductive and non-conductive states;
   - means including a connection between said device and said input terminal for alternately permitting charging of said capacitor through said impedance means when said transistor device is in a non-conductive state and discharging said capacitor through said transistor device when said transistor is in a conductive state;
   - and means for varying with temperature the time constant associated with said discharging of said capacitor, said varying means comprising a thermistor interposed in series with said capacitor in said feedback path.

3. In a television receiver, a vertical deflection circuit comprising the combination of:
   - a multistage transistor amplifier having an input terminal and an output terminal, said amplifier including an output transistor having base, emitter and collector electrodes, said collector electrode being coupled to said output terminal, and an emitter follower interposed between said input terminal and said base electrode;
   - a vertical deflection winding coupled to said output terminal;
   - means for establishing a negative feedback path between said output terminal and said input terminal of said amplifier, said feedback path including a capacitor;
   - impedance means for connecting said amplifier input terminal to a point of reference potential;
   - means, including a semiconductor device connected to said input terminal and subject to periodic switching between conductive and non-conductive states, for subjecting said capacitor to periodically alternating charging and discharging actions;
   - direct current conductive means for connecting a source of unidirectional potential of a first magnitude between said emitter and collector electrodes of said output transistor;
   - and additional direct current conductive means for connecting a source of unidirectional potential of a second magnitude, appreciably greater than said first magnitude, across said emitter follower.

4. In a television receiver, a vertical deflection circuit comprising the combination of:
   - a transistor amplifier having an input terminal and an output terminal;
   - a vertical deflection winding coupled to said output terminal;
   - means for establishing a negative feedback path between said output terminal and said input terminal of said amplifier, said feedback path including a capacitor;
   - impedance means connected to said amplifier input terminal;
   - a transistor device subject to periodic switching between conductive and non-conductive states;

means including a connection between said device and said input terminal for alternately permitting charging of said capacitor through said impedance means when said transistor device is in a non-conductive state and discharging said capacitor through said transistor device when said transistor is in a conductive state;

said transistor amplifier including an output transistor coupled to said output terminal and periodically rendered non-conductive in response to the conduction of said transistor device, said output transistor being subject to characteristic changes in response to variations in ambient temperature which tend to alter the effective turn-on time of said output transistor in the cycle of said periodic switching;

and a thermistor coupled to said capacitor in such manner as to be transversed by current during both the charging and the discharging of said capacitor, with resistance variations of said thermistor in response to ambient temperature variations having a greater effect on the magnitude of charge alteration effected during one of said charging and discharging periods than during the other, whereby any such resistance variation is reflected in a change in the residual charge on said capacitor at the end of a discharge period, the direction of said change in residual charge being such as to oppose the tendency of said output transistor characteristic changes to alter the effective turn-on time of said output transistor.

References Cited

UNITED STATES PATENTS

| | | | |
|---|---|---|---|
| 3,221,269 | 10/1965 | Davies | 315—27 |
| 3,229,151 | 1/1966 | Attwood | 315—27 |
| 2,964,673 | 12/1960 | Stanley | 315—27 |
| 3,007,079 | 10/1961 | Schuster. | |

RICHARD A. FARLEY, *Primary Examiner.*

J. G. BAXTER, *Assistant Examiner.*